H. M. BARBEAU.
GLASS GRINDING MACHINE.
APPLICATION FILED NOV. 22, 1918.
1,430,879.
Patented Oct. 3, 1922.
8 SHEETS—SHEET 1.
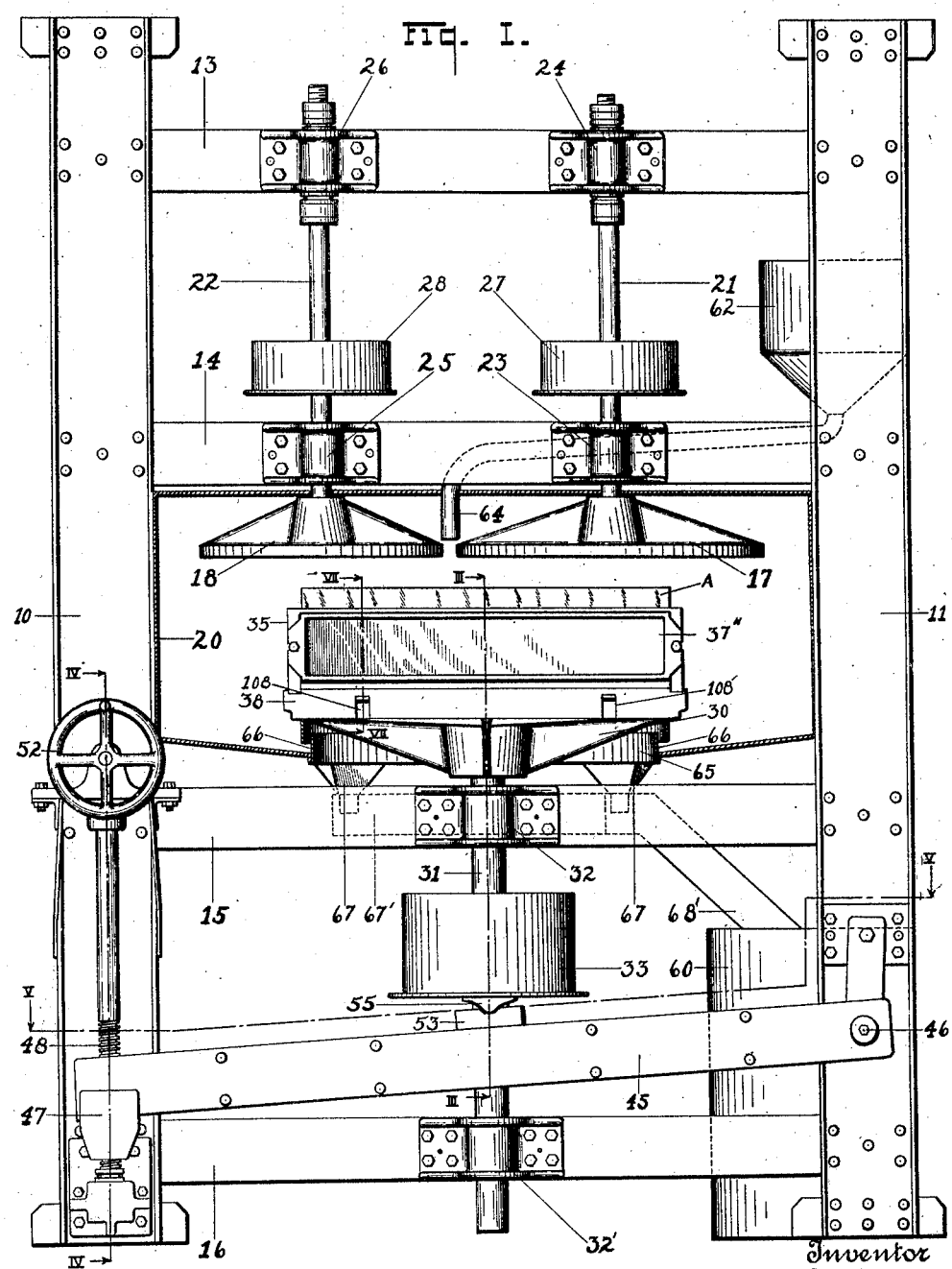
Fig. I.
Inventor
Harry M. Barbeau
By Chester H. Braselton
Attorney H. M. BARBEAU.
GLASS GRINDING MACHINE.
APPLICATION FILED NOV. 22, 1918.
1,430,879.
Patented Oct. 3, 1922.
8 SHEETS—SHEET 2.
Fig. I.
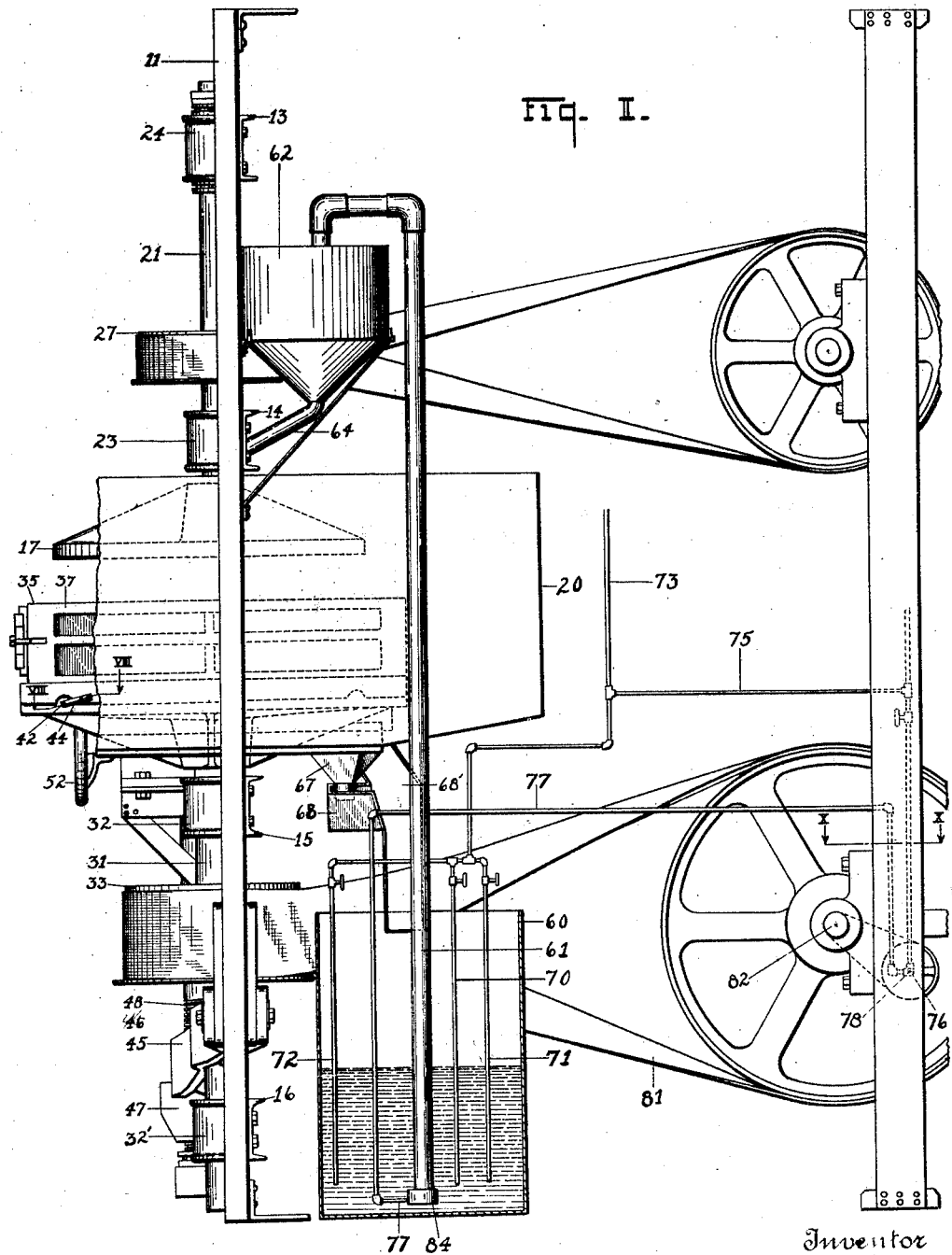
Inventor
Harry M. Barbeau
By Chester H. Braselton
Attorney

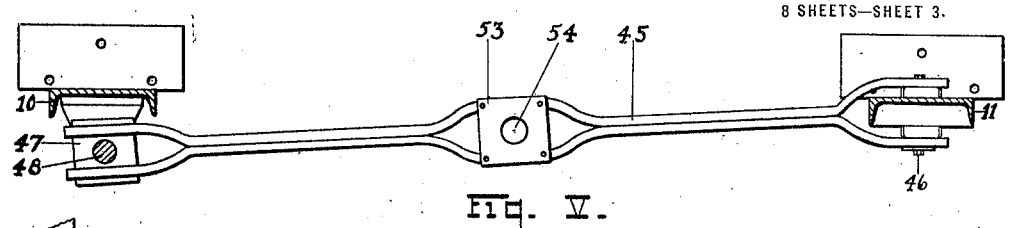
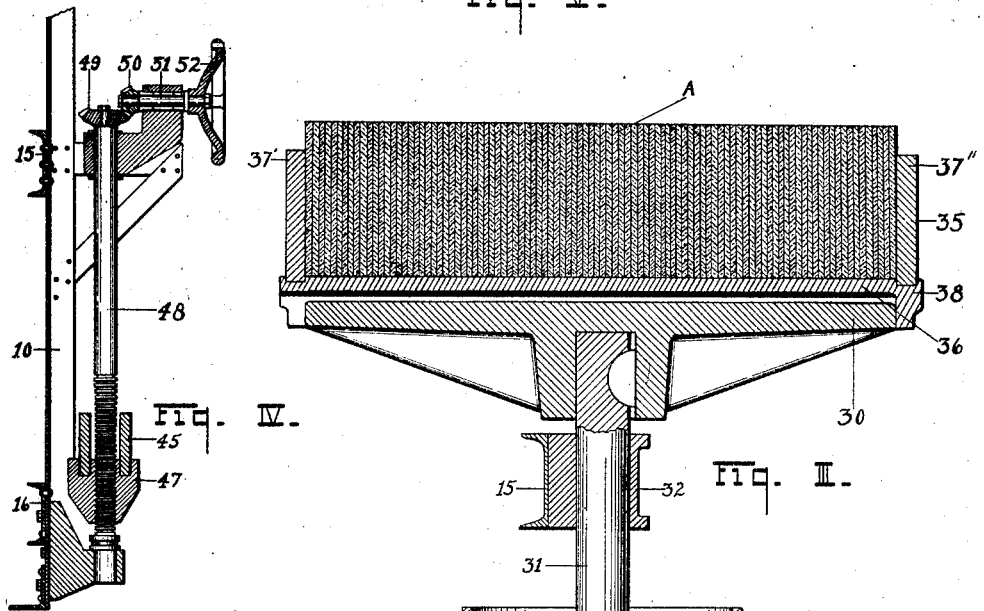
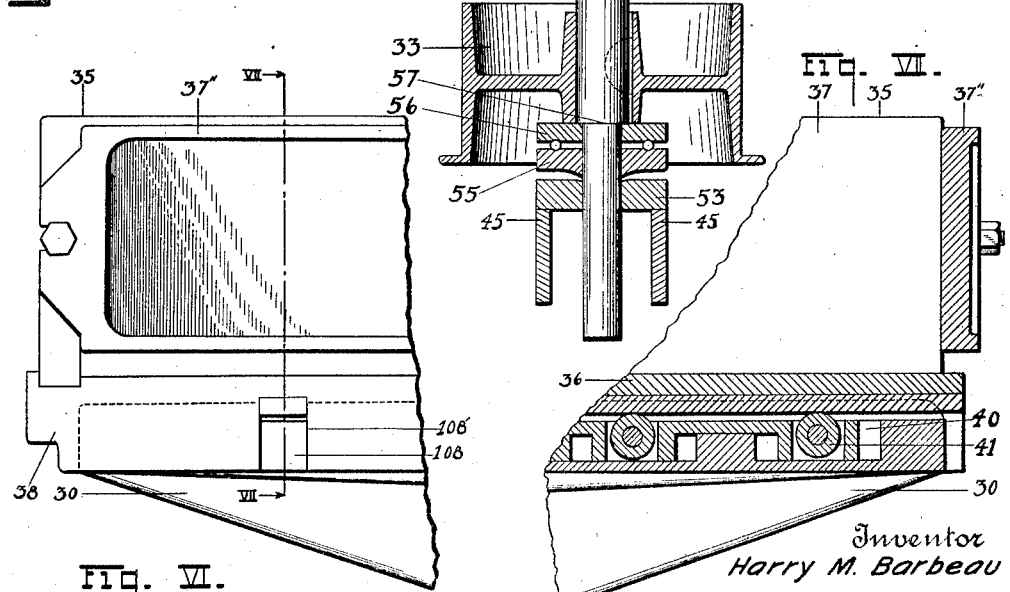

H. M. BARBEAU.
GLASS GRINDING MACHINE.
APPLICATION FILED NOV. 22, 1918.
1,430,879.
Patented Oct. 3, 1922.
8 SHEETS—SHEET 4.
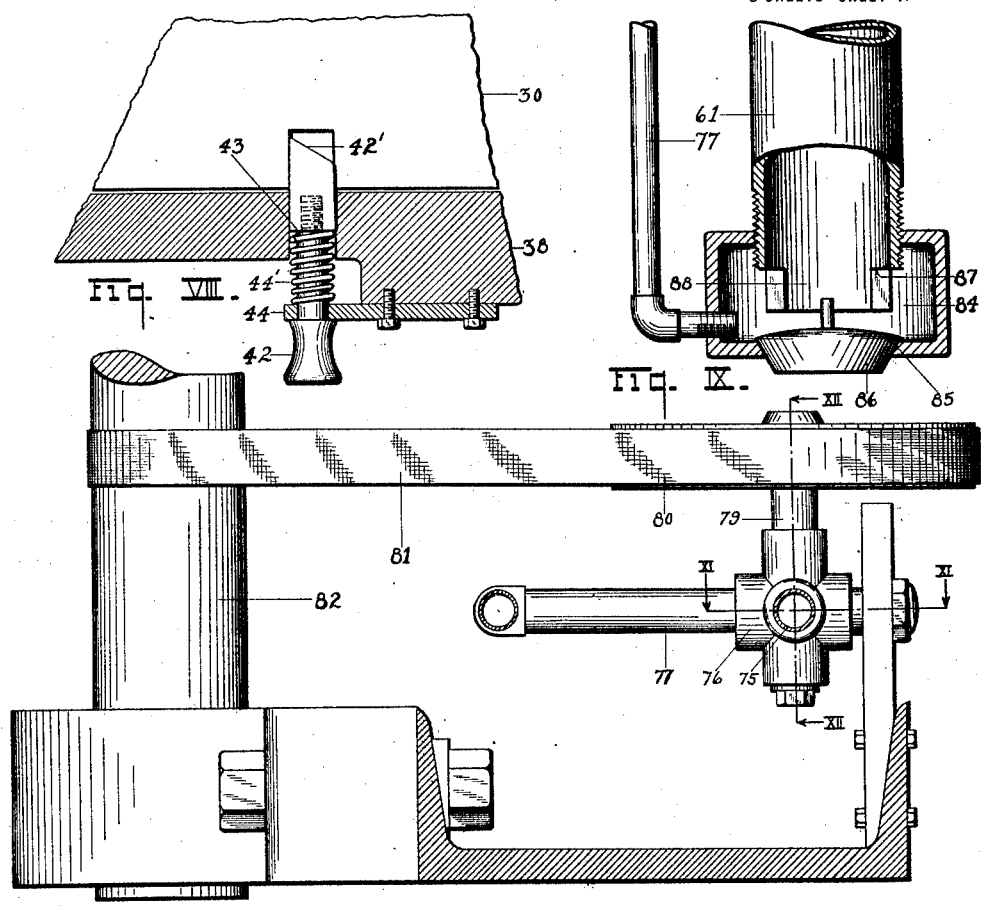
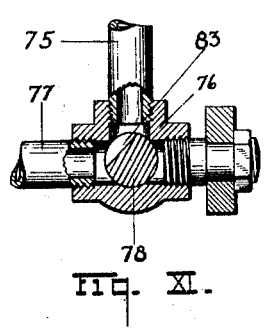
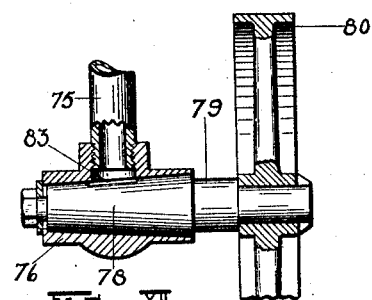
INVENTOR.
Harry M. Barbeau
BY
Chester H Braselton
ATTORNEY H. M. BARBEAU.
GLASS GRINDING MACHINE.
APPLICATION FILED NOV. 22, 1918.
1,430,879.
Patented Oct. 3, 1922.
8 SHEETS—SHEET 5.
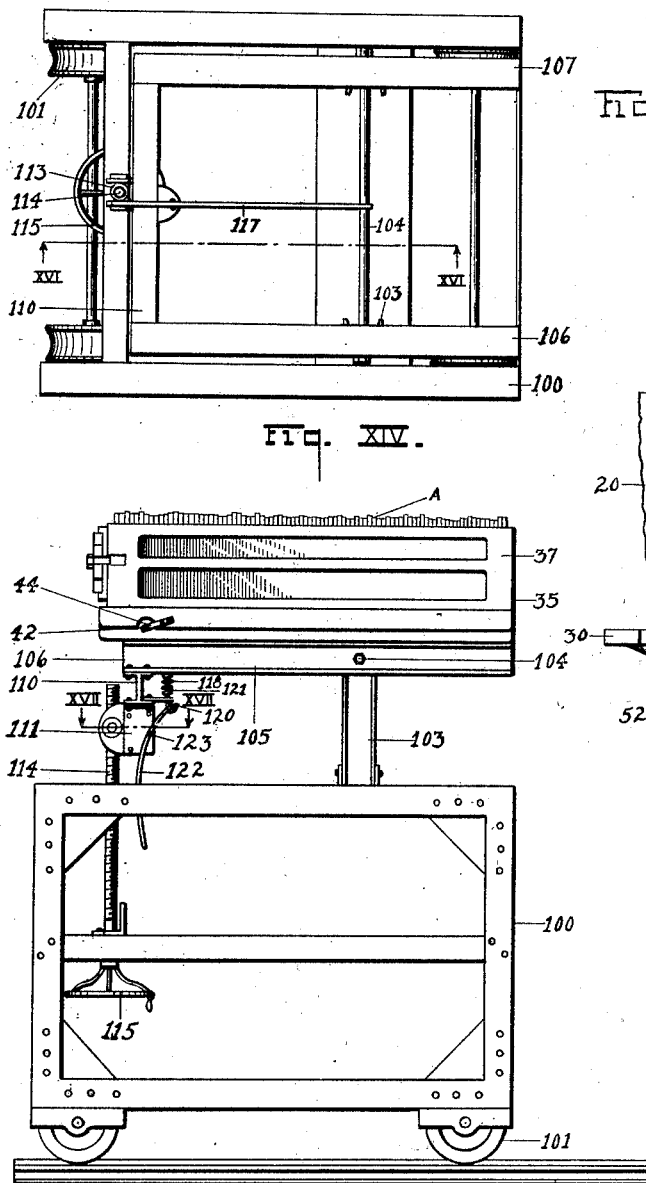
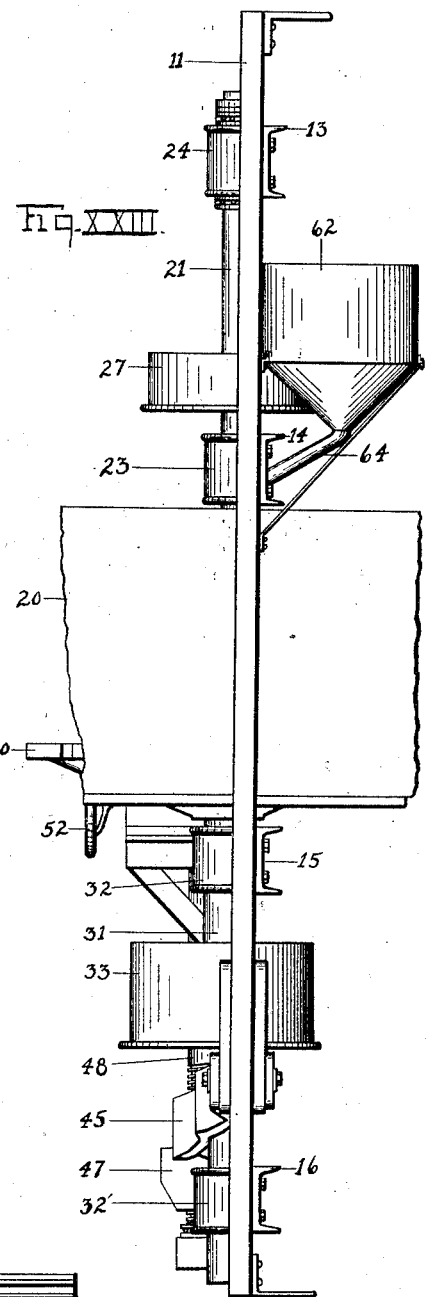
INVENTOR.
Harry M. Barbeau.
BY Chester H. Braselton
ATTORNEY

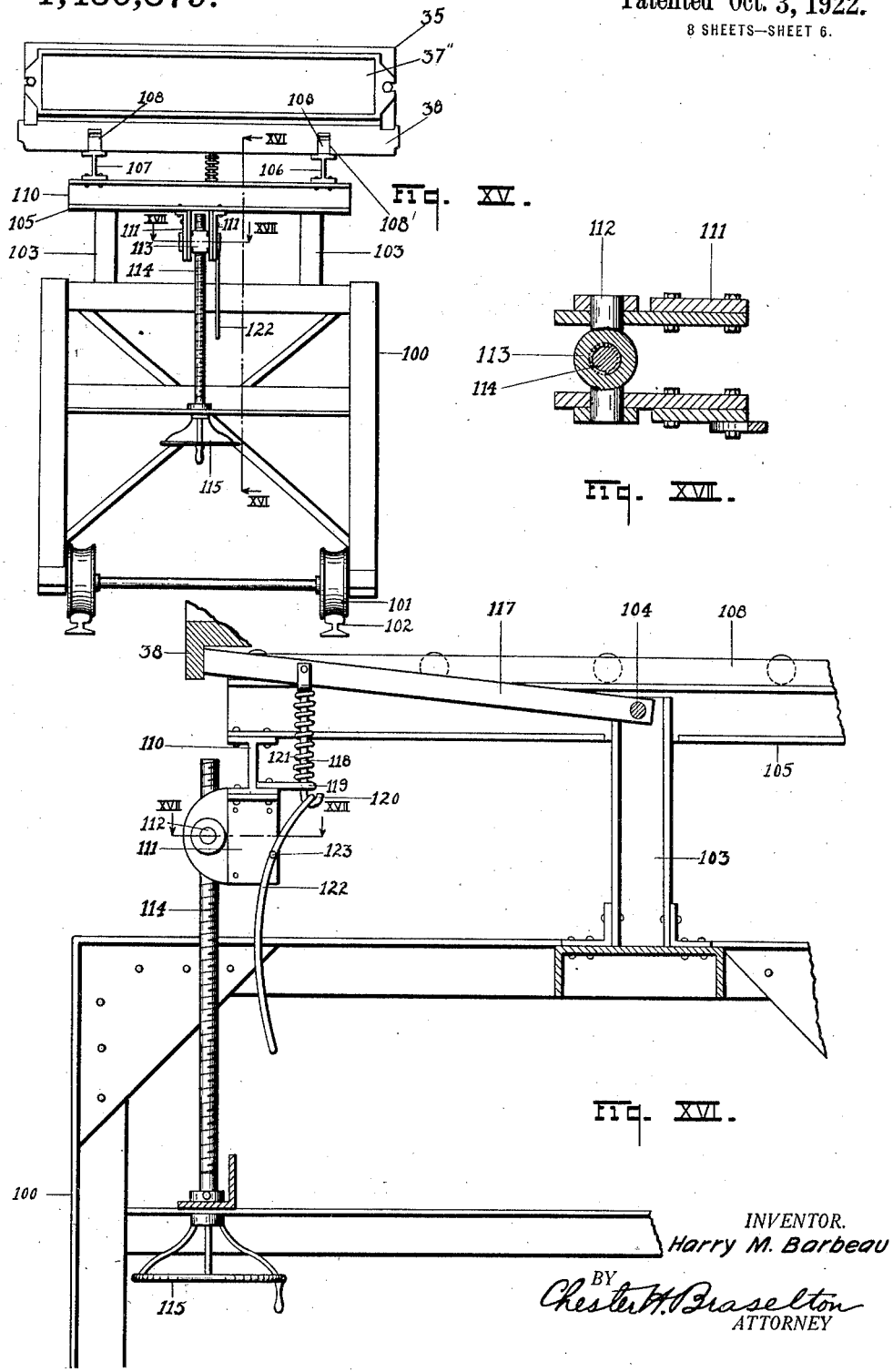

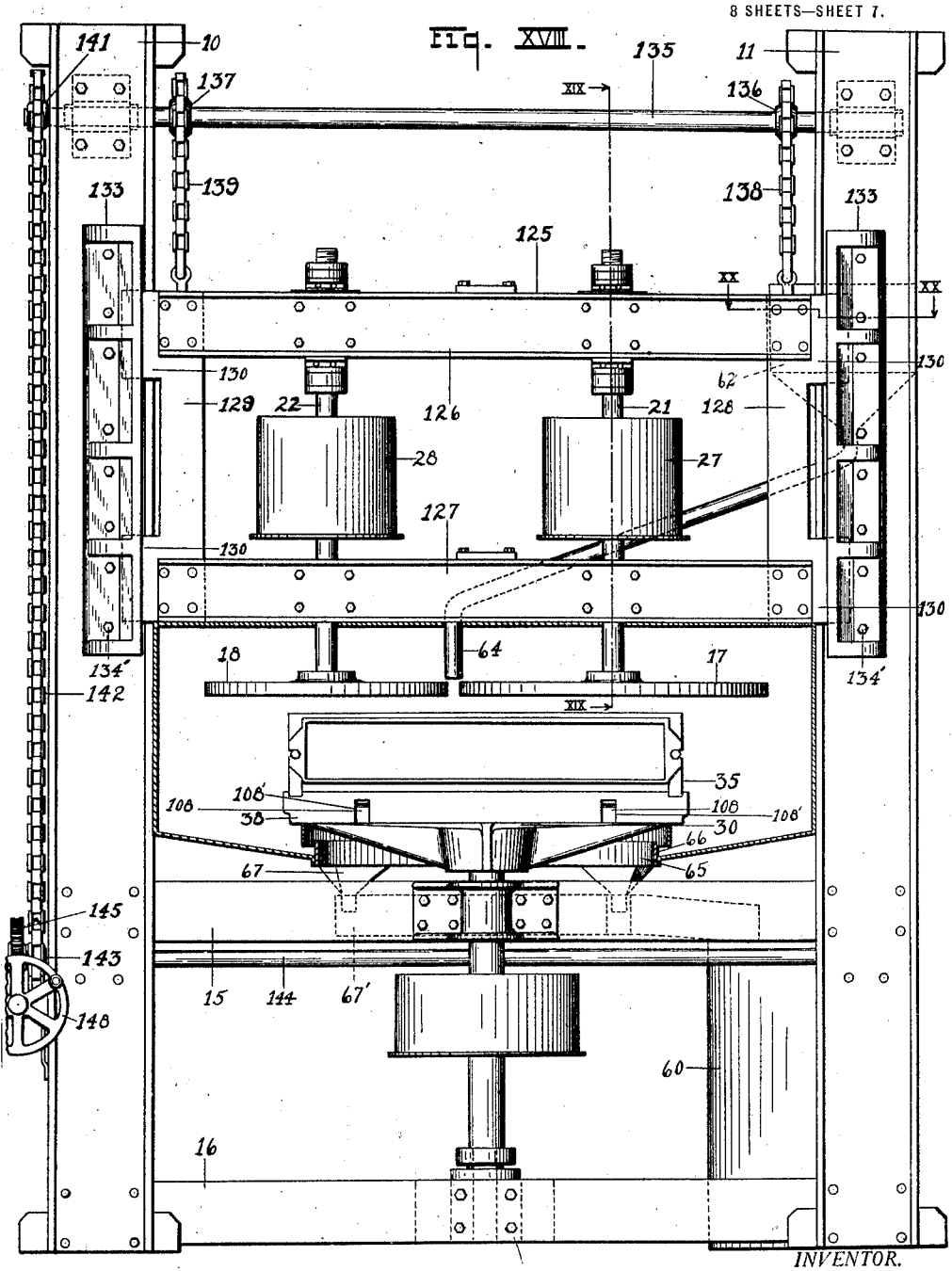

H. M. BARBEAU.
GLASS GRINDING MACHINE.
APPLICATION FILED NOV. 22, 1918.
1,430,879.
Patented Oct. 3, 1922.
8 SHEETS—SHEET 8.
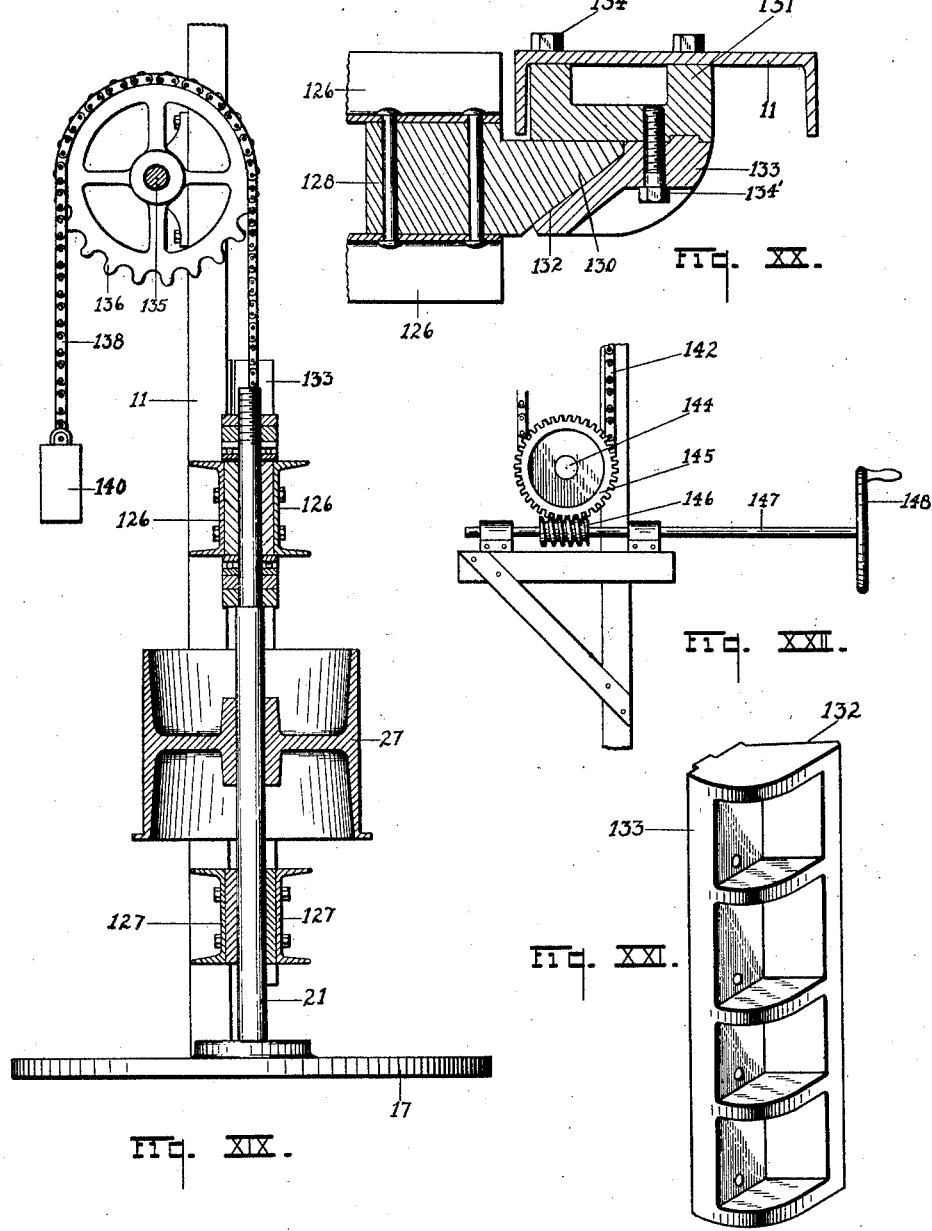
INVENTOR.
Harry M. Barbeau
BY
Chesty H. Braselton
ATTORNEY Patented Oct. 3, 1922.

1,430,879

UNITED STATES PATENT OFFICE.

HARRY M. BARBEAU, OF TOLEDO, OHIO, ASSIGNOR TO THE WILLYS-OVERLAND COMPANY, OF TOLEDO, OHIO, A CORPORATION OF OHIO.

GLASS-GRINDING MACHINE.

Application filed November 22, 1918. Serial No. 263,688.

*To all whom it may concern:*

Be it known that I, HARRY M. BARBEAU, residing at Toledo, county of Lucas, and State of Ohio, have invented certain new and useful Improvements in Glass-Grinding Machines, of which I declare the following to be a full, clear, and exact description.

The present invention relates to a glass grinding machine and has for an object, among others, to provide an improved construction preferably for simultaneously grinding a plurality of glass sheets down to a uniform desired size, the invention having particular utility, although not limited thereto, with the production of glass sheets for windshields for automobiles. The invention contemplates broadly the provision of a mechanism operative to grind glass sheets to size performing and operation heretofore done, in certain instances, by hand, and to provide a machine which is simple to construct, easily operated, and efficient in such operation.

Further objects of the invention are to so construct a machine of the character referred to that sheets of glass to be cut may be readily inserted in and properly supported by the machine, as well as readily withdrawn therefrom after an operation of grinding the edges of the glass has been completed.

Further objects of the invention are to provide a certain type of construction in a grinding mechanism, particularly adapted for the character of work contemplated by the machine, wherein there may be provided one or more grinding devices rotative to grind off the edges of the disc or plate suitably carried by a support, which may also be made rotative to co-operate with the grinding mechanisms, whereby when the support and grinding devices are driven in opposite directions, the time required for grinding is reduced to a minimum. Moreover, a special arrangement of a plurality of grinding discs relative to the sheets of glass located in the machine, if used, operate to grind the entire area desired, regardless of any space between the discs.

Further objects of the invention relate to the means employed for effecting a relative movement longitudinally between the grinding mechanism and plates so as to bring the glass carried by the support into operative position relative thereto, and adjust the same as the grinding operation continues to grind all portions of a sheet, and all sheets to size, this construction being simplified so as to reduce the number of parts to a minimum.

Further objects of the invention are to provide a novel system for loading the grinding machine, including a novel car or moving carrier, arranged to temporarily support and permit a removable container with the glass therein to be brought into such position that the same may be readily and easily moved into the grinding machine from the table, and when a grinding operation is completed, the container with all the sheets of glass therein may be then bodily removed from the machine onto the movable vehicle for carrying the completed sheets away.

Further objects of this invention relate to various economies in the manufacture of a machine of the character described, together with certain details of construction, as will hereinafter appear from the detailed description to follow. I accomplish the objects of my invention in certain instances by the devices and mechanism described in the following specification, but it is evident that the same may be widely varied without departing from the spirit and scope of the invention as pointed out in the appended claims. A structure constituting certain embodiments of my invention, one of which may be the preferred, is illustrated in the accompanying drawings, forming a part hereof, in which:

Figure I is a front elevation of one embodiment of the invention.

Figure II is a side elevation of the embodiment illustrated in Fig. I.

Figure III is a sectional view of the glass carrying table taken on the line III—III of Figure I.

Figure IV is a sectional view on the line IV—IV of Figure I, showing one form of support elevating and lowering the mechanism.

Figure V is a transverse sectional view taken on the line V—V of Figure I.

Figure VI is an enlarged elevation of a portion of the glass container located on a supporting table therefor.

Figure VII is a vertical sectional view 150 taken on the line VII—VII of Figure VI.

Figure VIII is a sectional view taken on the line VIII—VIII of Figure II, showing means for locking the glass receiving container to a support in the grinding machine.

Figure IX is an enlarged sectional view of the lower end of a pipe in an abrasive fluid tank showing a detail of the pneumatic pumping construction which may be used herein.

Figure X is a sectional view of an intermittent valve operating mechanism taken on the line X—X of Figure II.

Figure XI is a sectional view taken on the line XI—XI of Figure X.

Figure XII is a sectional view taken on the line XII—XII of Figure X.

Figure XIII is a side elevation of the glass supporting vehicle positioned adjacent to the grinding machine carrying a container with a plurality of glass sheets therein adapted to be transposed into position on the supporting table in the grinding machine.

Figure XIV is a plan view of a type of supporting frame used on the transporting vehicle.

Figure XV is an end elevation of the vehicle for transporting the container with glass sheets located therein to and from the machine.

Figure XVI is a sectional view taken on the line XVI—XVI of Figure XV.

Figure XVII is a sectional view taken on the line XVII—XVII of Figure XV.

Figure XVIII is a front elevational view of another embodiment of the grinding machine.

Figure XIX is a sectional view taken on the line XIX—XIX of Figure XVIII.

Figure XX is a sectional view taken on the line XX—XX of Figure XVIII.

Figure XXI is a perspective view of a guide member for a type of elevating means for the grinding discs, and Figure XXII is an elevational view of a raising and lowering mechanism therefor.

Figure XXIII is a view in side elevation of the first modification of the invention.

Referring to the embodiment of the invention illustrated in Figures I to XII inclusive, it will be seen that in one reduction to practice thereof I may provide a plurality of upright side posts 10 and 11 connected by a series of transverse brace beams 13, 14, 15 and 16. It is apparent, however, that any other type of supporting frame for the machine may be used. On such a frame, forming a support therefor, I have provided a plurality of main machine elements including a grinding mechanism, a glass supporting table adapted to receive and support, preferably a plurality of sheets of glass, and means for causing a relative movement between the support and grinding mechanism in order to bring the edges of the glass plates supported on the table into proper position to be ground and be adjusted as the grinding continues, to thus produce a uniform width of glass for the several sheets inserted in the machine.

To this end there is shown in the embodiment of the invention illustrated in Figures I to XII, a plurality of grinding discs 17 and 18, of different sizes, located within an enclosing receptacle 20. The grinding discs 17 and 18 are provided with vertical driving shafts 21 and 22, and it has been found that the transverse beams 13 and 14 form suitable means for carrying bearings 23, 24, 25 and 26 for operatively supporting these shafts 21 and 22 on the beams. Each of these shafts may be provided with driving pulleys 27 and 28 to receive belts for driving same from a suitable source of power, as will be apparent.

Located within the enclosing casing 20 is a flat table 30 carried and fixed on an upright vertical shaft 31. This shaft 31 extends downwardly through a suitable bearing 32 in the transverse beam 15 and through a corresponding bearing 32' carried by the lowermost transverse post 16. The shaft 31 is provided with a driving pulley 33 also adapted to be operated by a belt from a suitable source of power, and rotated in the opposite direction of the rotation of the grinding discs 17 and 18. The table 30 is adapted to receive a container or box-like support for a plurality of sheets of glass, and this construction will now be described.

By reference to Figures III, VI and VII, it will be seen that one construction of glass holder 35 is in the form of a box shaped container provided with a base 36, a plurality of side frames 37, a rear wall 37', and a detachable front side 37''. The base 36 is provided on the front and sides thereof with downwardly extending flanges 38 for the purpose of properly guiding and supporting the container on the table 30 against lateral movement, one of the flanges 38 co-operating with the front edge of the table 30 to limit the inward sliding movement of the container 35 onto the table 30. By reference to Figure VII, it will be seen that the table 30 may be provided, if desired, with a plurality of recesses 40 within which may be located rollers 41 extending slightly above the top plane of the base or table 30, upon which the bottom 36 of the glass container is adapted to roll upon the insertion and removal of the container from the table. This construction is entirely optional, however, and may be omitted if desired.

If desired, the container 35 which carries and holds a plurality of glass sheets A therein, may be additionally locked in position on the table 30 by any suitable lock, such as that shown in Figure VIII. To this end there is provided in one of the depending flanges 38 on the bottom of the container 36 a spring pressed latch member 42 having a beveled surcase 42'. Positioned between a shoulder 43 on the latch member and a supporting plate 44 therefor, is a coiled spring 44', adapted to normally project the latch 42 through the flange 38 of the container. The table 30 is provided with a recess into which the plunger or latch 42 is adapted to spring and automatically lock the flange 38 of the container 35 to the table 30, when the same is slid transversely thereof sufficiently to bring the front flange 38 into contact with an edge of the table 30. It will thus be seen that the container 35 with the glass sheets A therein is locked on the table so as to securely hold the same in position during an operation of the machine, which may include a rotation of the table 30.

In the embodiment of the invention illustrated in Figures I to XII inclusive, in order to raise and lower the glass to and from proper operative position relative to the grinding mechanism and adjust the same as portions of the glass are ground off, I have chosen to move the glass support and maintain the grinding discs stationary within the machine, the reverse being shown in a modification. To this end I have provided a movable lever 45, pivoted at 46 to the post 11, the other end of the lever being adjustable, there being a suitable threaded nut 47 on said lever, the nut being carried by a screw threaded rod 48. This rod 48 may be provided adjacent its upper end with a bevel gear 49 meshing with a bevel gear 50 on the end of a transverse shaft 51, which is provided on the outermost end on the front face of the machine with an operating handle 52. It will thus be seen that upon rotation of the wheel or handle 52 in one direction or the other, the lever 45 will be raised or lowered and that, by a proper manipulation of the wheel 52, the glass plates may be adjusted as the grinding operation proceeds to level up all the sheets on the support 30. By referring to Figure V it will be seen that one type of lever 45 comprises a plurality of plates secured together between their ends and provided substantially midway thereof with a widened portion between which is located a transverse block 53, having an opening 54 therein for receiving the table supporting shaft 31, as clearly appears from Figure III. Located on top of the plate 53 may be a bearing support 55 located just beneath a shoulder 57 on the shaft 31. This construction forms one suitable means for operatively associating the lever 45 with the rotating shaft 31, so as to cause a raising and lowering of the same according as the lever 45 is raised or lowered, as well as an adjustment thereof during the grinding operation, it being understood that the table supporting shaft 31 has a sliding fit in the bearings 32 and 32' which carry the shaft. The shoulder 57 and bearings 56 thus form a support for the shaft, and the pulley 33 may likewise be partially supported thereby.

Means are provided in the machine for supplying an abrasive fluid to the edges or portion of the glass being ground, one suitable arrangement for such a construction including a tank 60, suitably located on the floor adjacent to one of the posts 11 of the machine, an upwardly extending pipe 61, a receptacle or receiving tank 62 elevated above the grinding mechanism, and a suitable pipe or connection extending from the bottom of the tank 62 terminating in a downwardly extending end 64 located within the enclosure 20 and adjacent a space between the grinding discs 17 and 18. The bottom of the enclosure is provided with an opening 65, surrounding which is a flange 66, adapted to form means for collecting the abrasive fluid which has been supplied to the grinding surfaces within the enclosure 20, the base of the enclosure 20 having a plurality of drain troughs 67 and 67', which empty into a receiving projection 68 on a downwardly inclined trough 68', whereby the abrasive fluid is returned into the receiving tank 60.

If desired, a suitable means may be employed for agitating the abrasive fluid contained in the tank 60, such as a plurality of pipes 70, 71 and 72, connected through valves to a common source of air pipe 73, for supplying air under pressure to the several pipes 70, 71 and 72, to constantly agitate and mix the abrasive material within the tank 60, which may consist of a mixture of emery dust and liquid.

Suitable means for forcing the liquid from the tank 60 through the pipe 61 and into the elevated receptacle 62 may be employed, and preferably the same may consist of pneumatic means intermittently operated so as to deliver a certain amount of the liquid or abrasive material into the tank 62, as the same runs out into the grinding chamber 20. A suitable mechanism for this purpose consists in providing a branch pipe 75 leading from the common pipe 73 of the source of air under pressure, hence passing through a valved connection 76, and auxiliary pipe 77 to the bottom of the inlet portion of the upright pipe 61 which connects the tank 60 with the elevated reservoir 62. In the pipe section 76 I have located a valve 78 adapted to be intermittently operated to turn on and cut off the supply of air under pressure to the bottom of the pipe 61. This operating mechanism is illustrated in Figures X, XI and XII, where it will be seen that the valve 78 is provided with an extension or stud shaft 79 on which is located a pulley 80, connected by a belt 81 to the power shaft 82 for the machine. It will thus be seen that the valve 78 is continuously rotated so that the valve passage 83 therein intermittently establishes and cuts off communication between the air supply pipe 75 and the pipe 77. By reference to Figure IX it will be seen that I have provided the lower end of the pipe 61 with an enlargement or receiving inlet manifold 84, having an opening 85 in the base thereof, adapted to be closed by the check valve 86. The valve 86 is adapted to be closed upon a blast of air entering the manifold 84 from the inlet or supply pipe 77. It will be noted that the lower edge of the pipe 61 is provided with cut-out recessed portions 87 to provide projections 88 against which the valve 86 abuts, and that the fluid from the tank 60 may pass through the opening around the valve 86, through the recesses 87 and into the pipe 61. The valve construction described operates as a check valve in the pump of this character, and adapts itself to the intermittent action of the pumping means employed herein operative to raise pre-determined amounts of abrasive fluid from the tank 60 to the upper receiving receptacle 62, as the same is used by the grinding machine.

A suitable wheeled vehicle or carrier for supporting (during loading) and bring the glass container 35 up to and in transferring position in relation with the grinding machine will now be described. Thus, a box-like frame structure 100 may be provided with wheels 101 adapted to operate on suitable rails 102 which are laid up to the machine to permit the vehicle 100 to be pushed directly in front of the grinding chamber 20. It is desirable to incline the container 35 during loading and to this end the carrier 100 is provided with oppositely disposed upright arms or posts 103, one on each side of the table, and extending transversely between these posts 103 is a transverse rod 104, mounted to tiltingly support a second frame 105 on the posts 103. This frame 105 is composed of a plurality of longitudinal I-beams 106 and 107, each of which may be provided with rails 108 running along the upper surface of the I-beams, said rails being adapted to receive and support the container 35 thereon, there being certain longitudinally extending recesses 108' located in the base of the container 35 made for that purpose. The I-beams 106 and 107 are connected adjacent one end thereof by a transverse connecting beam 110. As suggested, in loading a plurality of sheets of glass in the cotnainer 35, it is desirable to maintain the same on an inclination sufficient to permit the glass sheets first inserted to be supported in an inclined manner, avoiding the necessity of any means for holding some of the same in position while the others are being loaded into the container. Moreover, the platform, if inclined, facilitates sliding the container onto the table 30 of the grinding machine. To this end I have provided means for elevating the tracks 108 by a suitable elevating mechanism which will now be described.

As shown in Figures XV, XVI and XVII, the transverse I beam 110 is provided centrally thereof with a pair of depending ears 111, each of the ears being provided with means to support a transverse stud 112 in which is carried centrally thereof a threaded nut or hub 113. This nut 113 is threaded on the upright screw threaded shaft 114, which is carried by the vehicle frame 100. The lower end of the shaft 114 is provided with a handle or wheel 115 for properly operating the shaft 114 to raise or lower the I beam 110 and consequently one end of the rails 108, the same pivoting by the rod 104 in the uprights 103. Releasable means are provided for maintaining the container 35 on the rails 108 when in inclined position, one suitable mechanism including a pivoted rod 117, shown in Figure XVI, this rod or arm 117 being adapted to engage the inner edge of the front depending flange 38 on the base of the container 35, to prevent the same from sliding longitudinally off the supporting rails. The arm 117 is provided with a downwardly extending stem or pin 118 extending through a guide 119 carried by the transverse I beam 110, and provided with a hooked end 120. Coiled around the stem 118 is a spring 121 adapted to bear aginst the arm 117 and against the guide 119, normally tending to maintain the rod 117 in elevated position. Connected to the hook 120 is a suitable handle 122 pivoted at 123 to the depending ears 111 adapted upon an operation to draw the stem 118 downwardly and carry with it the arm 117, releasing the same from latching engagement with the flange 38 to permit the container 35 to be slid onto the table 30 of the grinding machine. The rod 117 automatically latches the container 35 on the carrier 100 when the same is returned thereon.

An operation of the machine will, it is believed, be readily understood from the foregoing, where it will be seen that a load of glass sheets A packed in the container 35 while the container is preferably inclined on the vehicle 100 as suggested is thereupon drawn up in front of the machine and transferred onto the table 30, and the carrier 100 removed out of the way. After adjustment of the hand wheel 52 to position the glass plates, suitable power controlling means is manipulated and the shaft 31 is rotated in one direction while the grinding discs 17 and 18 are rotated in the opposite direction, while the pumping mechanism supplies an abrasive fluid to the pipe 64, between the two discs and adjacent to the surcaces or edges of the discs or sheets of glass A being ground. As certain of the highest portions on the sheets are ground off, the operator turns the handle 52 to continually adjust the table 30 and bring the several sheets nearer the grinding discs and thus eventually grind all the plates and all portions thereof to a common height.

Attention is called to the fact that, by the arrangement shown herein, while one large disc for grinding the edges of the glass might be used, yet by providing two discs, (each eccentric to the center of the rotating support for the glass sheets) each may be made smaller and operate more efficiently than a large one. Moreover, it is unnecessary to make disc 18 as large as disc 17, as disc 17 is overlapped relative to the center of the mass of plates A to avoid a space between the two discs from coming over said center which would leave an unground portion at the middle of the rotating mass of plates. By rotating both the discs 17 and 18 and table 30, and rotating the discs in opposite direction to the rotation of the support or table 30, it will be seen that a much more rapid action is obtained in grinding the glass sheets, the operation being concluded in considerably less time than would be required if the discs only were rotated as the result of the sum of the speeds of rotation obtained.

The embodiment of the invention illustrated in Figures XVIII and XXII inclusive will now be described. In this embodiment of the invention, the grinding discs 17 and 18 are lowered and elevated to bring the same into proper initial position and adjust the same during operation relative to the edges of the plates A instead of raising and lowering the table 30. A modified raising and lowering means may also be employed in this embodiment and I have shown by way of illustration the discs 17 and 18 mounted in a movable carrier 125, including a plurality of transverse beams 126 and 127, connected by uprights 128 and 129. In order to guide the movable carrier 125 as it is raised and lowered there may be provided extensions 130 on the uprights 128 and 129, which are adapted to slide in ways formed by the flat face of the guide member 131 and a beveled face 132 of a co-acting guide member 133', as illustrated in Figure XX. The guide member 131 may be secured to the side posts as by bolts 134, while the guide members 131 and 132 may be held securely in position to form the guide way for the extensions 130 of the uprights 128 and 129, as by bolts 134'.

Extending transversely between the posts 10 and 11 and adjacent to the upper end thereof is a transverse shaft 135, provided with sprockets 136 and 137 at either end of the same adjacent to posts 10 and 11. Extending between the sprockets 136 and 137 and the elevating carrier 125 are the chains 138 and 139 connected to the carriers and passing over the sprockets, the chains being preferably provided with counterweights 140 in order to properly position the chains. The shaft 135 extends longitudinally through the post 10 and is provided on its outer edge with a sprocket 141, to which is attached the endless chain 142 passing over a second sprocket 143 located adjacent to the lower portions of the machine, as is indicated by Figure XVIII. One means provided to rotate the sprocket 143 is illustrated in Figure XXII, where it will be seen that the sprocket shaft 144 is provided with a worm gear 145 with which meshes a worm 146 on a horizontally disposed shaft 147, which shaft extends outwardly towards the front of the machine and terminates in an operating hand wheel 148. It will thus be seen that, upon a proper operation of the wheel 148 the shaft 147 is operated to rotate, through the gearings 146 and 145, and the sprocket shaft 144. By this means the chain 142 is moved to rotate the shaft 135 in one direction or the other and raise and lower the carrier 125 accordingly. By this means the grinding discs 17 and 18 are brought down into initial operative proximity to the upper edges of the sheets of glass A for grinding, may be further lowered during grinding operation to bring the discs into contact with other portions of the plates as the highest points are worn off, and after the completion of the operation are raised therefrom in order to permit the carrier or supporting tray 35 to be removed from the grinding mechanism. It is apparent that in the embodiment of the invention as illustrated in Figures XVIII to XXII inclusive the grinding chamber 20 may be located lower than in the other construction of Figures I to XII inclusive, and the loading and unloading of the machine may be facilitated thereby. A lower vehicle 100 may be used.

While I have described the invention in more or less detail, and as being embodied in certain forms and arrangements, I do not desire or intend to be limited thereto since on the contrary my invention contemplates broadly all proper re-arrangements in the form, parts and elements of the mechanism, as well as the omission of immaterial elements and the substitution of equivalents therefor, and the re-arrangement and reorganization of the several elements as circumstances may suggest or necessity render expedient, so long as the mechanism comes within the broad scope of my invention.

Having thus described my invention, what I claim as new and desire to secure by Letters Patent is:

1. In a machine of the character described, the combination of a rotary grinding member, a member for supporting a plurality of sheets of glass edgewise, said supporting member being located eccentric to said grinding member, means for raising and lowering one of said members to adjust the distance between said two members, and means for rotating both of said members.

2. In a machine of the character described, the combination of a grinding mechanism including a plurality of rotating discs, means for supporting the lower edges of a plurality of sheets of glass and for holding them in vertical position, and means for supplying an abrasive material between said grinding discs and the upper edges of said sheets of glass.

3. In a machine of the class described, the combination of a glass grinding mechanism, means to operate said grinding mechanism, a table adapted to support a plurality of sheets of glass edgewise thereon, a shaft supporting said table, means to rotate said shaft, and means for causing a longitudinal movement between said shaft and said grinding mechanism to adjust the edges of said sheets of glass relative to the grinding mechanism.

4. In a machine of the character described, the combination of a grinding mechanism, a table in said machine, a detachable container retained on said table adapted to support a plurality of sheets of glass therein, flanges on the bottom of said container adapted to guide container on said table, and means to limit a movement between said container and said table.

5. In a machine of the character described, the combination of a grinding mechanism, a rotatable table in the machine, a container for supporting a plurality of glass sheets edgewise and means to secure the container on said table during rotation.

6. In a machine of the character described, the combination of a grinding mechanism, a table supported adjacent to said grinding mechanism, a detachable receiving container carried by said table, rollers on said table adapted to facilitate the application and removal of said container from said table, and means to limit the movement of the same relative to said table.

7. In a machine of the class described, a supporting means for a plurality of sheets of glass including a table and a plurality of rollers in said table, a detachable receiving container adapted to be slid on said table over said rollers, and flanges on said container adapted to engage the edges of said table and tie said container.

8. In a machine of the character described, the combination of means to support edgewise a plurality of sheets of glass, a glass grinding mechanism, means for causing a relative movement between said support and said grinding mechanism to adjust the edges of said sheets of glass relative to said grinding mechanism, means for operating said glass grinding mechanism to simultaneously grind a plurality of sheets of glass to a predetermined uniform size, and means to enclose said grinding mechanism and said supporting means.

9. In a machine of the character described, the combination of means to support edgewise a plurality of sheets of glass, a glass grinding mechanism, means for causing a relative movement between said support and said grinding mechanism to adjust the edges of said sheets of glass relative thereto, means for operating said glass grinding mechanism to simultaneously grind said plurality of sheets of glass to a predetermined uniform size, means to enclose said grinding mechanism and said supporting means, and means to supply an abrasive fluid thereto including a tank for the fluid.

10. In a machine of the character described, the combination of a grinding mechanism, a support for a plurality of glass sheets, means to move said perpendicular support to and from said grinding mechanism, said means including a movable lever connected with said support, and means to raise and lower said lever.

11. In a machine of the character described, the combination of a grinding mechanism, a support for a plurality of glass sheets, means to move said support to and from said grinding mechanism, said means including a movable lever pivoted to a portion of the machine and connected with said support, and means to raise and lower said lever.

12. In a machine of the character described, the combination of a grinding mechanism, supporting means for holding a plurality of glass sheets edgewise therein, means to adjust said sheets of glass relative to said grinding mechanism including a movable lever, said lever having an opening therein, a shaft extending downwardly from said support passing through said opening, means on said shaft for supporting the same on said lever, and means on the lever for raising and lowering the same.

13. In a machine of the class described, the combination of a grinding mechanism, a table adapted to support a container with a plurality of sheets of glass therein, a shaft for said table, a shoulder on said shaft, a lever extending transversely in the machine and provided with means to engage the shoulder on said shaft, and support said shaft on said lever, and means to raise and lower said lever.

14. In a machine of the class described, the combination of a grinding mechanism, a table adapted to support a container with a plurality of sheets of glass therein, a shaft for said table, a shoulder on said shaft, a pivoted lever extending transversely in the machine and provided with means to engage the shoulder on said shaft, and support said shaft on said lever, and means to raise and lower said lever.

15. A movable table for carrying a container with a plurality of glass sheets therein to and from a grinding machine, including in combination a frame, a pivotal support for said frame, means for tilting said frame, and means for supporting a container for a plurality of sheets of glass on said frame.

16. A movable table for carrying a container with a plurality of glass sheets therein to and from a grinding machine, including in combination a frame, pivotally supported on said table, and means for raising and lowering an edge of said frame to locate said frame in an inclined position, means for supporting a container for a plurality of sheets of glass on said frame, and means for releasably latching said container to the frame on said table.

17. In combination, means for grinding the edges of windshield glasses, comprising a rotary table, a container for a plurality of glasses adapted to support the same edgewise in vertical planes upon the top of said table, a rotary grinder mounted above said table, said table and grinder being capable of movement one towards and from the other, and means under the control of the operator for causing said approaching or receding movement.

18. In a glass grinding machine, a container adapted to hold a plurality of sheets of glass side by side, said container having a base upon which the lower edges of the glass rest, a table upon which the container is supported, a loading truck for said container, and means upon the truck for tilting the container.

19. In a glass grinding machine, a container adapted to hold a plurality of sheets of glass side by side, the said container having a base upon which the lower edges of the glass rest, a table upon which the container is supported, a loading truck having a tiltable support for said container, and antifriction means between said support and container.

20. In a glass grinding machine, a container adapted to hold a plurality of sheets of glass side by side, said container having a base upon which the lower edges of the glass rest, a table upon which the container is supported, a loading truck having a tiltable support for said container, and a catch for holding the container upon the support when the latter is in tilted position.

21. In a glass grinding machine, a container adapted to hold a plurality of sheets of glass side by side, the said container having a base upon which the lower edges of the glass rest, a table upon which the container is supported, a loading truck having a tiltable support for said container, and an automatically acting catch for holding the container upon the support when the latter is in tilted position.

22. In a glass grinding machine, having a horizontal work support, a container for holding a plurality of glass plates with their sides together upon said support comprising a flat base upon which the lower edges of the plates rest, means for supporting the sides of the outermost plates and for supporting the side edges of all the plates, and a grinder arranged to act upon the upper edges of the plates.

23. In a machine for grinding the edges of glass plates, a holder for supporting the plates vertically on edge in a pack having a flat surface upon which the lower edges of the plates rest, and means for holding the plates together and in position upon said holder whereby their upper edges may be ground simultaneously.

24. In a machine for grinding the edges of a series of glass plates, the combination of a holder for a plurality of glass plates, a rotatable grinding member opposite said holder, and means for mounting said holder to rotate on an axis parallel to said glass plates.

25. In a machine for grinding the edges of a series of glass plates, the combination of a holder for said series of glass plates, a rotatably mounted grinding member opposite said holder, and means for supporting said holder to rotate on an axis eccentric to said grinding member and parallel to the planes of said glass plates.

In testimony whereof I affix my signature.

HARRY M. BARBEAU.